United States Patent
Zhang et al.

(10) Patent No.: US 12,513,619 B2
(45) Date of Patent: Dec. 30, 2025

(54) WI-FI COMMUNICATION METHOD AND APPARATUS

(71) Applicant: HUAWEI TECHNOLOGIES CO., LTD., Guangdong (CN)

(72) Inventors: Lu Zhang, Shanghai (CN); Jianqiao Wang, Shanghai (CN); Lianbing Tian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 568 days.

(21) Appl. No.: 17/969,885

(22) Filed: Oct. 20, 2022

(65) Prior Publication Data

US 2023/0041512 A1 Feb. 9, 2023

Related U.S. Application Data

(63) Continuation of application No. PCT/CN2020/085990, filed on Apr. 21, 2020.

(51) Int. Cl.
*H04W 52/02* (2009.01)
*H04W 84/12* (2009.01)

(52) U.S. Cl.
CPC ... *H04W 52/0216* (2013.01); *H04W 52/0229* (2013.01); *H04W 84/12* (2013.01)

(58) Field of Classification Search
CPC ......... H04W 52/0216; H04W 52/0229; H04W 84/12
See application file for complete search history.

(56) References Cited

U.S. PATENT DOCUMENTS

| | | | | |
|---|---|---|---|---|
| 2013/0034004 A1* | 2/2013 | Mannemala | ...... | H04W 52/0216 370/252 |
| 2013/0272180 A1* | 10/2013 | Hiremath | ...... | H04W 56/0035 370/311 |

(Continued)

FOREIGN PATENT DOCUMENTS

CN 108924918 A 11/2018

OTHER PUBLICATIONS

Payam Torab, DMG Power Save Corrections, IEEE 802.11-15/920r1, Jul. 2015, 13 pages.

(Continued)

*Primary Examiner* — Kevin C. Harper
*Assistant Examiner* — Salma Ayad

(57) ABSTRACT

Embodiments of this application provide a Wi-Fi communication method and apparatus, and relate to the wireless communication field. A station may obtain detection information including a start time point at which an access point actually starts to send a beacon packet to the station for one time, obtain a low power consumption parameter based on the detection information and a first time interval, and receive the beacon packet from the access point based on the low power consumption parameter. The low power consumption parameter includes an actual wakeup period of the station and an actual receive window length within which the station receives the beacon packet, or the low power consumption parameter includes an actual wakeup period of the station, and the actual wakeup period of the station is greater than a preconfigured wakeup period of the station.

15 Claims, 7 Drawing Sheets

(56) References Cited

U.S. PATENT DOCUMENTS

| | | | | |
|---|---|---|---|---|
| 2015/0334592 | A1* | 11/2015 | Choi ........................ | H04W 4/70 370/311 |
| 2017/0280383 | A1* | 9/2017 | Park ........................ | H04W 4/06 |
| 2021/0211979 | A1* | 7/2021 | Kim .................. | H04W 56/0055 |

OTHER PUBLICATIONS

International Search Report and Written Opinion issued in PCT/CN2020/085990, dated Jan. 14, 2021, 10 pages.

Office Action issued in CN202080098658.4, dated Jan. 31, 2024, 7 pages.

\* cited by examiner (a)

(b)

WI-FI COMMUNICATION METHOD AND APPARATUS

CROSS-REFERENCE TO RELATED APPLICATIONS

This application is a continuation of International Application No. PCT/CN2020/085990, filed on Apr. 21, 2020, the disclosure of which is hereby incorporated by reference in its entirety.

TECHNICAL FIELD

Embodiments of this application relate to the wireless communication field, and in particular, to a wireless fidelity (Wi-Fi) communication method and apparatus.

BACKGROUND

In an internet of things (IoT), a station connected to the IoT may periodically transition from a sleep state to an awake state. A station in the sleep state does not send a packet to an access point in the IoT, and does not receive a packet from the access point. When the station is in the sleep state, the access point may buffer a packet for the station. A station in the awake state may receive a beacon packet periodically sent by the access point. The beacon packet may be used to indicate whether the access point stores a buffered packet of the station. If the access point stores the buffered packet of the station, the station receives the buffered packet from the access point. If the access point does not store the buffered packet of the station, the station enters the sleep state.

A wakeup period of the station is preconfigured. In other words, the station always transitions from the sleep state to the awake state based on the preconfigured wakeup period. However, there is high power consumption when the access point does not send the buffered packet to the station for a long time period, and the station still transitions from the sleep state to the awake state based on the preconfigured wakeup period.

SUMMARY

Embodiments of this application provide a Wi-Fi communication method and apparatus. A station may adjust a wakeup period based on a detection result, to reduce power consumption of the station.

To achieve the foregoing objective, the following technical solutions are used in embodiments of this application.

According to a first aspect, an embodiment of this application provides a Wi-Fi communication method. The method is applied to a station, and the method includes: obtaining detection information, where the detection information includes at least one first time point, and the first time point is a start time point at which an access point actually starts to send a beacon packet to the station for one time; obtaining a low power consumption parameter based on the detection information and a first time interval, where the first time interval is a preconfigured time interval at which the access point sends the beacon packet to the station, the low power consumption parameter includes an actual wakeup period of the station and an actual receive window length within which the station receives the beacon packet, or the low power consumption parameter includes an actual wakeup period of the station, and the actual wakeup period of the station is greater than a preconfigured wakeup period of the station; and receiving the beacon packet from the access point based on the low power consumption parameter.

In the method provided in the first aspect, the station may obtain the detection information, obtain the low power consumption parameter based on the detection information and the first time interval, and receive the beacon packet from the access point based on the low power consumption parameter. In this way, the station adjusts the actual wakeup period of the station based on the detected at least one first time point and the first time interval, so that the actual wakeup period of the station is greater than or equal to the preconfigured wakeup period of the station, to reduce power consumption of the station.

With reference to the first aspect, in a first possible implementation, the obtaining a low power consumption parameter based on the detection information and a first time interval includes: determining at least one second time point in a one-to-one correspondence with the at least one first time point based on a start time point at which the access point previously started to send the beacon packet to the station at the first time interval and the first time interval, where one second time point is a start time point at which the access point starts to send the beacon packet to the station at the first time interval for one time; and obtaining the low power consumption parameter based on the detection information, the at least one second time point, and the preconfigured wakeup period of the station, where the preconfigured wakeup period of the station is the same as the first time interval. In the method, the station may calculate the at least one second time point in the one-to-one correspondence with the at least one first time point, and obtain the low power consumption parameter based on the detection information, the at least one second time point, and the preconfigured wakeup period of the station, so that the actual wakeup period of the station is greater than or equal to the preconfigured wakeup period of the station, to reduce power consumption of the station.

With reference to the first possible implementation of the first aspect, in a second possible implementation, the low power consumption parameter includes the actual wakeup period of the station and the actual receive window length within which the station receives the beacon packet; and the obtaining the low power consumption parameter based on the detection information, the at least one second time point, and the preconfigured wakeup period of the station includes: obtaining at least one first offset, where each first offset is an offset of a first time point relative to a second time point corresponding to the first time point; and obtaining the low power consumption parameter based on the at least one first offset and the preconfigured wakeup period of the station, where there is a correspondence between the first offset and the actual wakeup period of the station. In the method, the station may adjust the actual wakeup period of the station based on the detected at least one first time point and the first time interval. When the first offset is large, the actual wakeup period of the station is small, and power consumption of the station is large; and when the first offset is small, the actual wakeup period of the station is large, and the power consumption of the station is small. Therefore, the station may adjust the actual wakeup period of the station based on a detection result, so that the station has a minimum power consumption when a success rate of receiving the beacon packet by the station is ensured. In addition, the station may further determine the actual receive window length within which the station receives the beacon packet, to improve the success rate of receiving the beacon packet by the station.

With reference to the first possible implementation of the first aspect, in a third possible implementation, the low power consumption parameter includes the actual wakeup period of the station; and the obtaining the low power consumption parameter based on the detection information, the at least one second time point, and the preconfigured wakeup period of the station includes: obtaining at least one first offset, where each first offset is an offset of a first time point relative to a second time point corresponding to the first time point; obtaining an expected wakeup period of the station based on the at least one first offset and the preconfigured wakeup period of the station, where there is a correspondence between the expected wakeup period of the station and the first offset; and performing a composite operation on the expected wakeup period of the station and the first time interval, to obtain the low power consumption parameter. In the method, the station may obtain the expected wakeup period of the station based on the detected at least one first time point and the first time interval, and calculate the actual wakeup period of the station based on the expected wakeup period of the station. When the first offset is large, the expected wakeup period of the station is small, the actual wakeup period that is of the station and that is obtained based on the expected wakeup period of the station is also small, and power consumption of the station is large; and when the first offset is small, the expected wakeup period of the station is large, the actual wakeup period that is of the station and that is obtained based on the expected wakeup period of the station is large, and the power consumption of the station is small. Therefore, the station may adjust the actual wakeup period of the station based on a detection result, so that the station has a minimum power consumption when a success rate of receiving the beacon packet by the station is ensured.

With reference to the first possible implementation of the first aspect, in a fourth possible implementation, the detection information further includes at least one third time point, one third time point is a start time point at which the access point actually starts to send a response packet to the station for one time, one third time point corresponds to one fourth time point, and the fourth time point is a start time point at which the station indicates the access point to start to send the response packet to the station. In the method, the station may further adjust the actual wakeup period of the station based on the start time point at which the access point actually starts to send the response packet to the station and the start time point at which the station indicates the access point to start to send the response packet to the station.

With reference to the fourth possible implementation of the first aspect, in a fifth possible implementation, the low power consumption parameter includes the actual wakeup period of the station and the actual receive window length within which the station receives the beacon packet; and the obtaining the low power consumption parameter based on the detection information, the at least one second time point, and the preconfigured wakeup period of the station includes: obtaining at least one first offset, where each first offset is an offset of a first time point relative to a second time point corresponding to the first time point; obtaining at least one second offset, where each second offset is an offset of a third time point relative to a fourth time point corresponding to the third time point; and obtaining the low power consumption parameter based on the at least one first offset, the at least one second offset, and the preconfigured wakeup period of the station, where there is a correspondence among the first offset, the second offset, and the actual wakeup period of the station. In the method, the station may adjust the actual wakeup period of the station based on the detected at least one first time point, the at least one third time point, at least one fourth time point at which the station performs an indication, and the first time interval. When the first offset and the second offset are large, the actual wakeup period of the station is small, and power consumption of the station is large; and when the first offset and the second offset are small, the actual wakeup period of the station is large, and the power consumption of the station is small. Therefore, the station may adjust the actual wakeup period of the station based on a detection result, so that the station has a minimum power consumption when a success rate of receiving the beacon packet by the station is ensured. In addition, the station may further determine the actual receive window length within which the station receives the beacon packet, to improve the success rate of receiving the beacon packet by the station.

With reference to the fourth possible implementation of the first aspect, in a sixth possible implementation, the low power consumption parameter includes the actual wakeup period of the station; and the obtaining the low power consumption parameter based on the detection information, the at least one second time point, and the preconfigured wakeup period of the station includes: obtaining at least one first offset, where each first offset is an offset of a first time point relative to a second time point corresponding to the first time point; obtaining at least one second offset, where each second offset is an offset of a third time point relative to a fourth time point corresponding to the third time point; obtaining an expected wakeup period of the station based on the at least one first offset, the at least one second offset, and the preconfigured wakeup period of the station, where there is a correspondence among the first offset, the second offset, and the expected wakeup period of the station; and performing a composite operation on the expected wakeup period of the station and the first time interval, to obtain the low power consumption parameter. In the method, the station may obtain the expected wakeup period of the station based on the detected at least one first time point, the detected at least one third time point, and the first time interval, and calculate the actual wakeup period of the station based on the expected wakeup period of the station. When the first offset and the second offset are large, the expected wakeup period of the station is small, the actual wakeup period that is of the station and that is obtained based on the expected wakeup period of the station is also small, and power consumption of the station is large; and when the first offset and the second offset are small, the expected wakeup period of the station is large, the actual wakeup period that is of the station and that is obtained based on the expected wakeup period of the station is large, and the power consumption of the station is small. Therefore, the station may adjust the actual wakeup period of the station based on a detection result, so that the station has a minimum power consumption when a success rate of receiving the beacon packet by the station is ensured.

According to a second aspect, an embodiment of this application provides a communication apparatus. The communication apparatus includes a transceiver unit and a processing unit. The transceiver unit is configured to obtain detection information. The detection information includes at least one first time point, and the first time point is a start time point at which an access point actually starts to send a beacon packet to the communication apparatus for one time. The processing unit is configured to obtain a low power consumption parameter based on the detection information and a first time interval. The first time interval is a preconfigured time interval at which the access point sends the beacon packet to the communication apparatus, the low power consumption parameter includes an actual wakeup period of the communication apparatus and an actual receive window length within which the communication apparatus receives the beacon packet, or the low power consumption parameter includes an actual wakeup period of the communication apparatus, and the actual wakeup period of the communication apparatus is greater than a preconfigured wakeup period of the communication apparatus. The processing unit is further configured to receive the beacon packet from the access point based on the low power consumption parameter.

With reference to the second aspect, in a first possible implementation, the processing unit is specifically configured to determine at least one second time point in a one-to-one correspondence with the at least one first time point based on a start time point at which the access point previously started to send the beacon packet to the communication apparatus at the first time interval and the first time interval. One second time point is a start time point at which the access point starts to send the beacon packet to the communication apparatus at the first time interval for one time. The processing unit is further specifically configured to obtain the low power consumption parameter based on the detection information, the at least one second time point, and the preconfigured wakeup period of the communication apparatus. The preconfigured wakeup period of the communication apparatus is the same as the first time interval.

With reference to the first possible implementation of the second aspect, in a second possible implementation, the low power consumption parameter includes the actual wakeup period of the communication apparatus and the actual receive window length within which the communication apparatus receives the beacon packet. The processing unit is specifically configured to obtain at least one first offset. Each first offset is an offset of a first time point relative to a second time point corresponding to the first time point. The processing unit is further specifically configured to obtain the low power consumption parameter based on the at least one first offset and the preconfigured wakeup period of the communication apparatus. There is a correspondence between the first offset and the actual wakeup period of the communication apparatus.

With reference to the first possible implementation of the second aspect, in a third possible implementation, the low power consumption parameter includes the actual wakeup period of the communication apparatus. The processing unit is specifically configured to obtain at least one first offset. Each first offset is an offset of a first time point relative to a second time point corresponding to the first time point. The processing unit is further specifically configured to obtain an expected wakeup period of the communication apparatus based on the at least one first offset and the preconfigured wakeup period of the communication apparatus. There is a correspondence between the expected wakeup period of the communication apparatus and the first offset. The processing unit is further specifically configured to perform a composite operation on the expected wakeup period of the communication apparatus and the first time interval, to obtain the low power consumption parameter.

With reference to the first possible implementation of the second aspect, in a fourth possible implementation, the detection information further includes at least one third time point, one third time point is a start time point at which the access point actually starts to send a response packet to the communication apparatus for one time, one third time point corresponds to one fourth time point, and the fourth time point is a start time point at which the communication apparatus indicates the access point to start to send the response packet to the communication apparatus.

With reference to the fourth possible implementation of the second aspect, in a fifth possible implementation, the low power consumption parameter includes the actual wakeup period of the communication apparatus and the actual receive window length within which the communication apparatus receives the beacon packet. The processing unit is specifically configured to obtain at least one first offset. Each first offset is an offset of a first time point relative to a second time point corresponding to the first time point. The processing unit is further specifically configured to obtain at least one second offset, where each second offset is an offset of a third time point relative to a fourth time point corresponding to the third time point. The processing unit is further specifically configured to obtain the low power consumption parameter based on the at least one first offset, the at least one second offset, and the preconfigured wakeup period of the communication apparatus. There is a correspondence among the first offset, the second offset, and the actual wakeup period of the communication apparatus.

With reference to the fourth possible implementation of the second aspect, in a sixth possible implementation, the low power consumption parameter includes the actual wakeup period of the communication apparatus. The processing unit is specifically configured to obtain at least one first offset. Each first offset is an offset of a first time point relative to a second time point corresponding to the first time point. The processing unit is further specifically configured to obtain at least one second offset. Each second offset is an offset of a third time point relative to a fourth time point corresponding to the third time point. The processing unit is further specifically configured to obtain an expected wakeup period of the communication apparatus based on the at least one first offset, the at least one second offset, and the preconfigured wakeup period of the communication apparatus. There is a correspondence among the first offset, the second offset, and the expected wakeup period of the communication apparatus. The processing unit is further specifically configured to perform a composite operation on the expected wakeup period of the communication apparatus and the first time interval, to obtain the low power consumption parameter.

According to a third aspect, an embodiment of this application provides a communication apparatus, including a processor. The processor is coupled to a memory, and the memory is configured to store a program or instructions. When the program or the instructions are executed by the processor, the apparatus is enabled to implement the method in any one of the first aspect or the possible implementations of the first aspect.

According to a fourth aspect, an embodiment of this application provides a communication apparatus. The apparatus is configured to implement the method in any one of the first aspect or the possible implementations of the first aspect.

According to a fifth aspect, an embodiment of this application provides a computer-readable medium. The computer-readable medium stores a computer program or instructions. When the computer program or instructions are executed, a computer is enabled to perform the method in any one of the first aspect or the possible implementations of the first aspect.

According to a sixth aspect, an embodiment of this application provides a computer program product. The computer program product includes computer program code. When the computer program code is run on a computer, the computer is enabled to perform the method in any one of the first aspect or the possible implementations of the first aspect.

According to a seventh aspect, an embodiment of this application provides a chip, including a processor. The processor is coupled to a memory, and the memory is configured to store a program or instructions. When the program or the instructions are executed by the processor, the chip is enabled to implement the method in any one of the first aspect or the possible implementations of the first aspect.

It can be understood that any communication apparatus, the chip, the computer-readable medium, the computer program product, or the like that is provided above is used to perform a corresponding method provided above. Therefore, for a beneficial effect that can be achieved by the any communication apparatus, the chip, the computer-readable medium, the computer program product, or the like that is provided above, refer to beneficial effects in the corresponding method. Details are not described herein again.

DESCRIPTION OF EMBODIMENTS

The following describes the implementations of embodiments of this application in detail with reference to the accompanying drawings.

A method provided in embodiments of this application may be applied to a Wi-Fi system. The following describes the method provided in embodiments of this application only by using a communication system 10 shown in FIG. 1 as an example.

Figure 1:
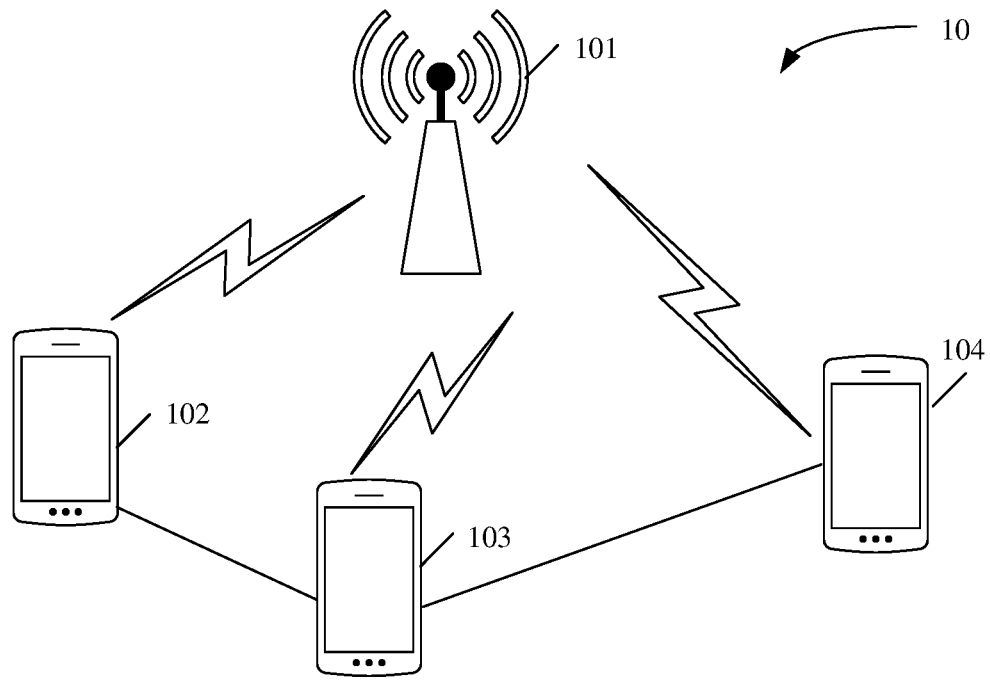
FIG. 1 is a schematic diagram of an architecture of a communication system according to an embodiment of this application.

FIG. 1 is a schematic diagram of an architecture of a communication system 10 according to an embodiment of this application. In FIG. 1, the communication system 10 may include one or more access points 101 (only one access point is shown) and stations 102 to 104 that may communicate with the access point 101. FIG. 1 is merely a schematic diagram, and does not constitute a limitation on a scenario to which a technical solution provided in this application is applicable.

The access point in FIG. 1, for example, the access point 101, may be any device having a wireless transceiver function. An access point includes but is not limited to an access node, a wireless relay node, or a wireless backhaul node in a Wi-Fi system. The access point may alternatively be a radio controller, a central unit (CU), and/or a distributed unit (DU) in a cloud radio access network (CRAN) scenario. The access point may alternatively be a server, a wearable device, a machine-type communication device, a vehicle-mounted device, or the like.

A station in FIG. 1, for example, a station 102, a station 103, or a station 104 is a device having a wireless transceiver function, and may be deployed on a land, including an indoor or outdoor device, a handheld device, a wearable device, or a vehicle-mounted device; or may be deployed on water (for example, a ship); or may be deployed in the air (for example, an airplane, a balloon, or a satellite). The station may be a mobile phone, a tablet computer (Pad), a computer having a wireless transceiver function, a virtual reality (VR) terminal device, an augmented reality (AR) terminal device, a terminal in industrial control, a vehicle-mounted terminal device, a terminal in self driving, a terminal in assisted driving, a terminal in remote medical, a terminal in smart grid, a terminal in transportation safety, a terminal in smart city, a terminal in smart home, or the like. Application scenarios are not limited in this embodiment of this application. The terminal device may also be sometimes referred to as a terminal, user equipment (UE), an access terminal, a vehicle-mounted terminal, a terminal in industrial control, a UE unit, a UE station, a mobile station, a mobile console, a remote station, a remote terminal, a mobile device, a UE terminal device, a wireless communication device, or a machine terminal, a UE proxy, a UE apparatus, or the like. The terminal may be fixed or mobile.

In this application, the station may be a station in an IoT system. An IoT is an important component of future information technology development. A main technical feature of the IoT is that an object is connected to a network by using a communication technology, to implement an intelligent network in which human-machine interconnection and object-object interconnection are implemented. The station in this application may be a terminal device in machine type communication (MTC).

The communication system 10 shown in FIG. 1 is merely used as an example, but is not used to limit the technical solution of this application. A person skilled in the art should understand that, in a specific implementation process, the communication system 10 may further include another device, and a quantity of access points and a quantity of stations may also be determined based on a specific requirement. This is not limited.

Optionally, each network element in FIG. 1 in this embodiment, for example, the station 102, the station 103, or the station 104, may be a functional module in an apparatus. It can be understood that the functional module may be a component in a hardware device, for example, a communication chip or a communication component in the station or the access point, or may be a software functional module running on hardware, or may be an example virtualization function on a platform (for example, a cloud platform).

Figure 2:
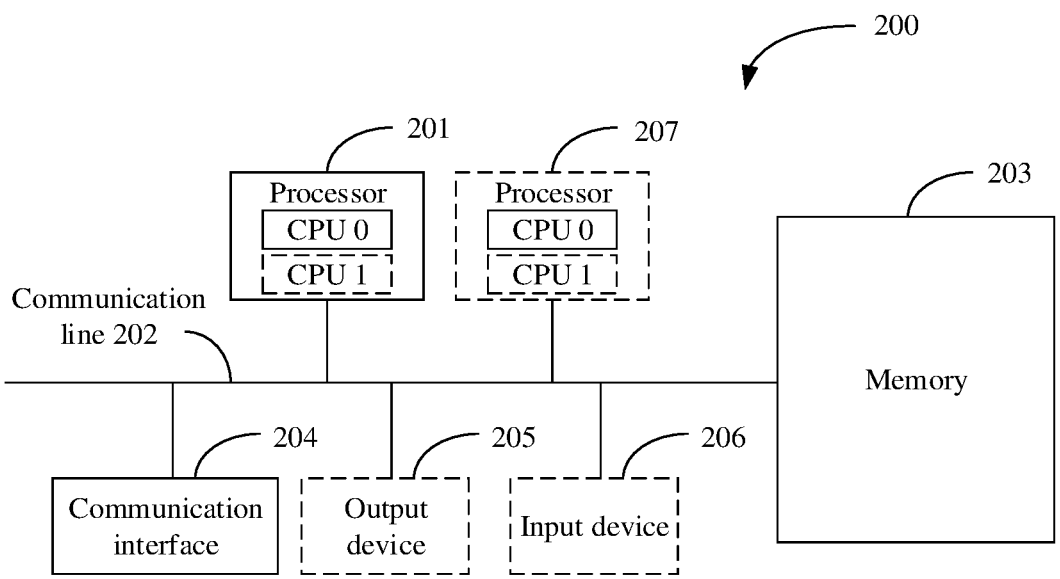
FIG. 2 is a schematic diagram of a hardware structure of a communication apparatus according to an embodiment of this application.

For example, each network element in FIG. 1 may be implemented by using a communication apparatus 200 in FIG. 2. FIG. 2 is a schematic diagram of a hardware structure of a communication apparatus applicable to an embodiment of this application. The communication apparatus 200 may include at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control execution of programs in the solutions in this application.

The communication line 202 may include a path used to transfer information between the foregoing components, for example, a bus.

The communication interface 204 may be any apparatus of a transceiver type, and is configured to communicate with another device or a communication network, for example, an Ethernet interface, a radio access network (RAN) interface, or a wireless local area network (WLAN) interface.

For example, the memory 203 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 203 is not limited thereto. The memory may exist independently, and is connected to the processor through the communication line 202. Alternatively, the memory may be integrated with the processor. The memory provided in this embodiment may be usually non-volatile. The memory 203 is configured to store computer-executable instructions for performing the solutions in this application, and the processor 201 controls execution. The processor 201 is configured to execute the computer execution instructions stored in the memory 203, to implement the method provided in embodiments of this application.

Optionally, computer-executable instructions in this embodiment may also be referred to as application program code. This is not specifically limited in this embodiment.

During a specific implementation, in an embodiment, the processor 201 may include one or more CPUs, for example, a CPU 0 and a CPU 1 in FIG. 2.

In an embodiment, the communication apparatus 200 may include a plurality of processors such as the processor 201 and a processor 207 in FIG. 2. Each of the processors may be a single-core (single-CPU) processor or a multi-core (multi-CPU) processor. Herein, the processor may be one or more devices, circuits, and/or processing cores configured to process data (for example, computer program instructions).

In an embodiment, the communication apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive user input in a plurality of manners. For example, the input device 206 may be a mouse, a keyboard, a touchscreen device, or a sensor device.

With reference to FIG. 1 and FIG. 2, that a Wi-Fi communication method is applied to a station is used as an example below to specifically describe the Wi-Fi communication method provided in embodiments of this application. A network element in the following embodiments may include the components shown in FIG. 2.

It should be noted that names of messages between network elements, names of parameters in the messages, or the like in the following embodiments of this application are merely examples, and there may be other names during a specific implementation. This is not specifically limited in embodiments of this application.

It can be understood that, in embodiments of this application, the station may perform some or all of the steps in embodiments of this application. These steps are merely examples. In embodiments of this application, another step or variations of various steps may be performed. In addition, the steps may be performed in different sequences presented in embodiments of this application, and not all the steps in embodiments of this application may be performed.

Figure 3:
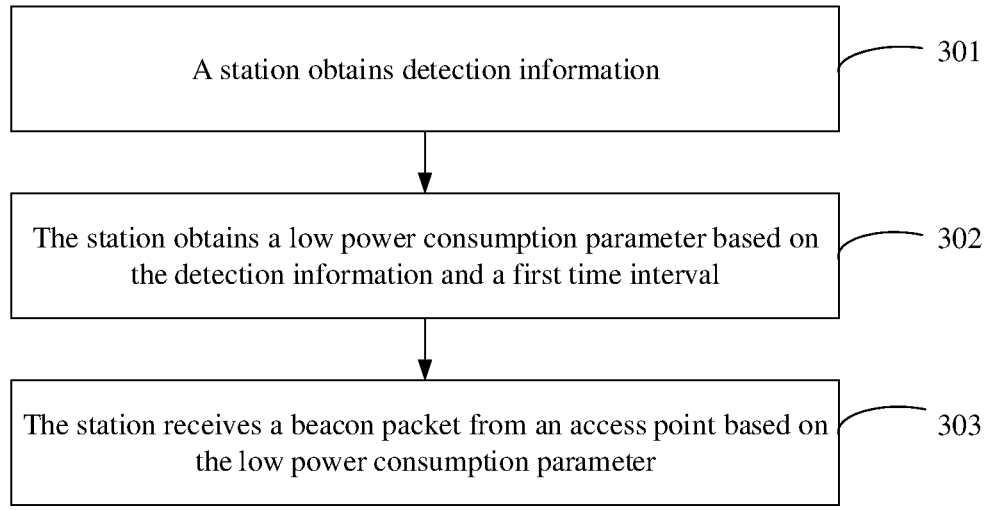
FIG. 3 is a schematic flowchart 1 of a Wi-Fi communication method according to an embodiment of this application.

FIG. 3 shows a Wi-Fi communication method according to an embodiment of this application. The Wi-Fi communication method includes step 301 to step 303.

Step 301: A station obtains detection information.

The station may be any station in the station 102 to the station 104 shown in FIG. 1, or the station may be a component of any station in the station 102 to the station 104. For example, the station is a processor of any station in the station 102 to the station 104, a chip of any station in the station 102 to the station 104, or a chip system of any station in the station 102 to the station 104. This is not limited.

Optionally, the station is in an awake state.

The detection information may include at least one first time point. The first time point is a start time point at which an access point actually starts to send a beacon packet to the station for one time.

The access point may be the access point 101 shown in FIG. 1, or the access point may be a component of the access point 101 shown in FIG. 1. For example, the access point may be a processor of the access point 101 shown in FIG. 1, a chip of the access point 101 shown in FIG. 1, or a chip system of the access point 101 shown in FIG. 1. This is not limited.

Optionally, before step 301, the station obtains a first time interval. The first time interval is a preset time interval at which the access point sends the beacon packet to the station. The first time interval is preset or stored in the access point. When the station accesses the access point for a first time, the access point sends, to the station, a packet indicating the first time interval.

The packet indicating the first time interval includes the first time interval; or the packet indicating the first time interval includes a third time interval and a first count. The first time interval is a product of the third time interval and the first count. For example, if the third time interval included in the packet indicating the first time interval is 100 milliseconds (ms), and the first count is 3, the first time interval is 300 ms.

It can be understood that, when the station accesses the access point for the first time, the access point indicates, to the station, that the beacon packet is broadcast every first time interval. Therefore, the station may also wake up every first time interval, and receive the beacon packet from the access point, to detect whether the access point has a buffered packet of the station. However, in an actual application, due to a reason such as performance of the access point, the access point may not broadcast the beacon packet at the first time interval. Therefore, if the station still wakes up every first time interval, it is possible that the station cannot receive the beacon packet from the access point. Consequently, whether the access point has the buffered packet of the station cannot be detected. In order to make sure that the station can receive the beacon packet from the access point each time the station wakes up, the station may detect, in the awake state, a time interval, namely, a second time interval, at which the access point actually sends the beacon packet to the station.

Figure 4:
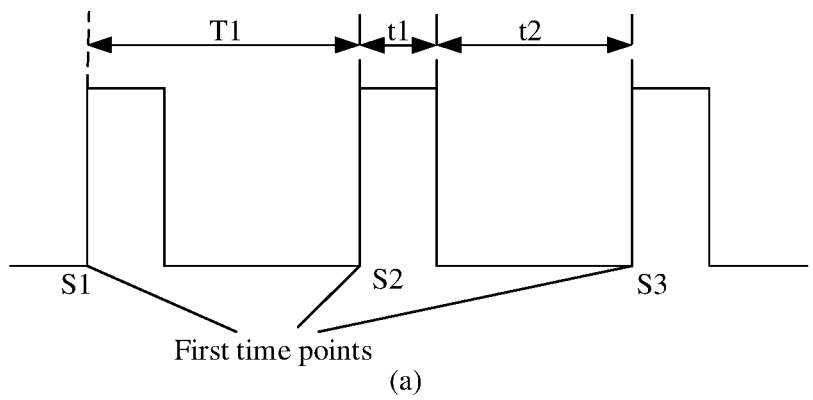
FIG. 4 is a schematic diagram of a first time interval and a second time interval according to an embodiment of this application.
Figure 4:
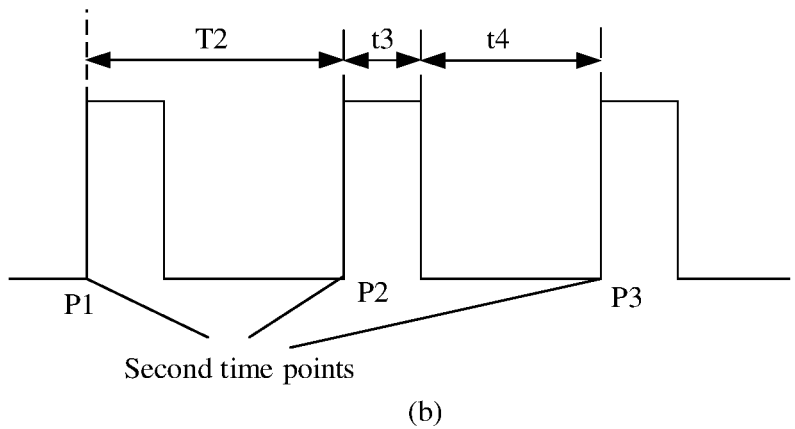

A relationship between the second time interval and the first time interval may be shown in FIG. 4. (a) in FIG. 4 is a schematic diagram of a second time interval, and (b) in FIG. 4 is a schematic diagram of a first time interval. In (a) in FIG. 4, T1 indicates the second time interval, t1 indicates a time length within which the station is in the awake state, t2 indicates a time length within which the station is in a sleep state, (a) in FIG. 4 shows that the access point actually sends the beacon packet to the station for three times, and a start time point at which the access point starts to send the beacon packet each time is a first time point, namely, S1, S2, and S3 in (a) in FIG. 4. In (b) in FIG. 4, T2 represents the first time interval, t3 represents a preset time length within which the station is in the awake state, t4 represents a preset time length within which the station is in the sleep state, (b) in FIG. 4 shows a case in which the access point sends the beacon packet to the station at the first time interval, and a start time point at which the access point starts to send the beacon packet to the station at the first time interval is a second time point, namely, P1, P2, and P3 in (b) in FIG. 4.

Optionally, a process in which the station obtains the detection information is as follows: When the station is in the awake state, the station sends the detection packet to the access point for one or more times, and triggers the access point to communicate with the station in a low power consumption mode, so that the station learns of a capability of the access point to send the beacon packet, and obtains the detection information based on the capability of the access point to send the beacon packet. That the access point communicates with the station in the low power consumption mode can be understood as follows: After receiving indication information, from the station, indicating that the station is to transition to the sleep state, the access point buffers a packet for the station, and periodically broadcasts the beacon packet; and sends the buffered packet of the station to the station when receiving indication information, from the station, indicating that the station is to transition to the awake state.

For example, the station in the awake state sends a first detection packet to the access point. The first detection packet is used to indicate that the station is to transition to the sleep state. Actually, the station is still in the awake state. The station receives the beacon packet from the access point, and obtains the first time point. To improve accuracy of a subsequently obtained low power consumption parameter, the foregoing step may be repeatedly performed, so that the station obtains a plurality of first time points.

Figure 5:
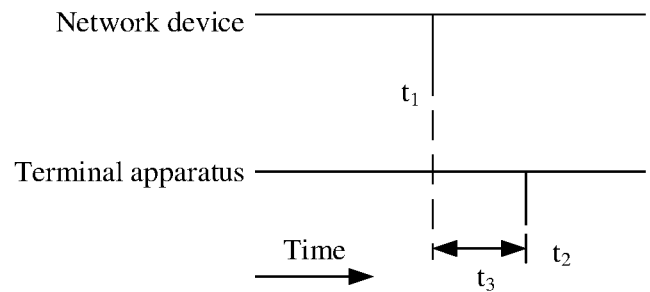
FIG. 5 is a schematic diagram of a delay between a time point at which an access point sends a packet and a time point at which a station receives the packet according to an embodiment of this application.

The beacon packet includes the first time point. After receiving the beacon packet, the station obtains the first time point. Alternatively, the station stores a delay between a time point at which the station receives a packet from the access point and a time point at which the access point sends the packet. After receiving the beacon packet, the station obtains the first time point based on a time point at which the beacon packet is received and the delay. For example, as shown in FIG. 5, the first time point is a moment $t_1$, and the station receives the beacon packet at a moment $t_2$, and $t_3$ is the delay, stored by the station, between the time point at which the station receives the packet from the access point and the time point at which the access point sends the packet. Therefore, $t_1=t_2-t_3$.

Further, optionally, the detection information further includes at least one third time point. The third time point is a start time point at which the access point actually starts to send a response packet to the station for one time. The response packet is a packet sent by the access point based on an indication of the station. One third time point corresponds to one fourth time point, and the fourth time point is a start time point at which the station indicates the access point to start to send the response packet to the station.

For example, the station in the awake state sends a second detection packet to the access point. The second detection packet is used to indicate that the station is to transition to the sleep state and indicate the fourth time point. Actually, the station is still in the awake state. The station receives the beacon packet and the response packet from the access point, and obtains the first time point and the third time point. To improve accuracy of a subsequently obtained low power consumption parameter, the foregoing step may be repeatedly performed, so that the station obtains a plurality of first time points and a plurality of third time points.

For a process in which the station obtains the first time point, refer to the description in the foregoing example. Details are not described again.

It can be understood that, the station indicates the access point to send the response packet to the station at the fourth time point. However, in an actual application, due to a reason such as performance of the access point, the access point may not send the response packet at the fourth time point, but send the response packet at the third time point.

The response packet includes the third time point. After receiving the response packet, the station obtains the third time point. Alternatively, the station stores the delay between the time point at which the station receives the packet from the access point and the time point at which the access point sends the packet. After receiving the response packet, the station obtains the third time point based on a time point at which the response packet is received and the delay.

For example, the station in the awake state may alternatively send the first detection packet and the second detection packet to the access point alternately, so that the station obtains the at least one first time point and the at least one third time point.

Optionally, the station obtains the detection information when being connected to the access point for a first time; or any application in the station triggers the station to obtain the detection information. For example, when a WeChat application in the station needs to adjust a wakeup period of the station, the WeChat application in the station triggers the station to obtain the detection information. Alternatively, a higher layer of the station triggers the station to obtain the detection information. For example, an application layer of the station triggers the station to obtain the detection information.

Step 302: The station obtains the low power consumption parameter based on the detection information and the first time interval.

The low power consumption parameter may include an actual wakeup period of the station and an actual receive window length within which the station receives the beacon packet, or the low power consumption parameter may include an actual wakeup period of the station. The actual wakeup period of the station is greater than or equal to a preconfigured wakeup period of the station. The actual receive window length within which the station receives the beacon packet indicates a time length within which the station is actually in the awake state.

Optionally, the obtaining the low power consumption parameter based on the detection information and the first time interval includes: determining at least one second time point in a one-to-one correspondence with the at least one first time point based on a start time point at which the access point previously started to send the beacon packet to the station at the first time interval and the first time interval; and obtaining the low power consumption parameter based on the detection information, the at least one second time point, and the preconfigured wakeup period of the station. The preconfigured wakeup period of the station is the same as the first time interval. One second time point is a start time point at which the access point starts to send the beacon packet to the station at the first time interval for one time.

Figure 6:
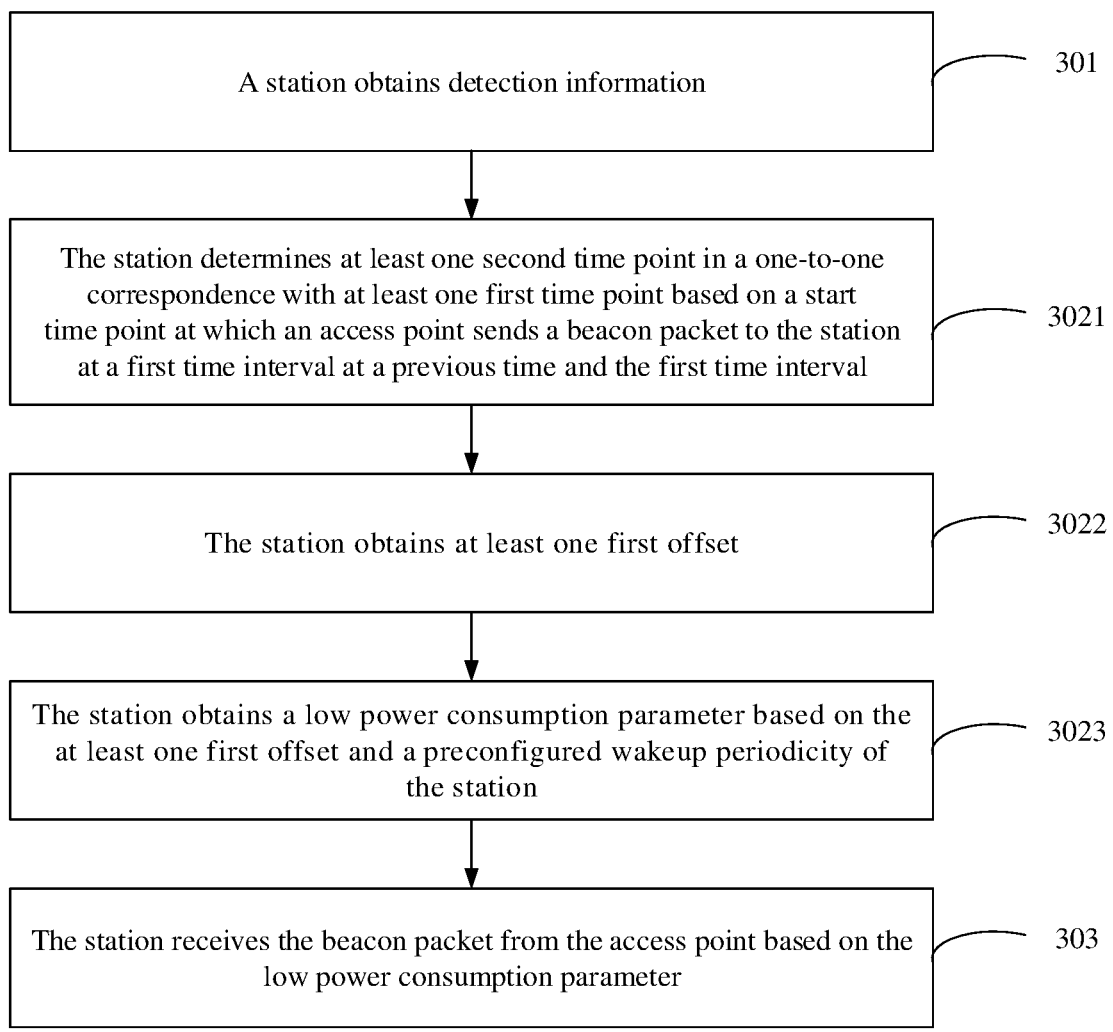
FIG. 6 is a schematic flowchart 2 of a Wi-Fi communication method according to an embodiment of this application.
Figure 7:
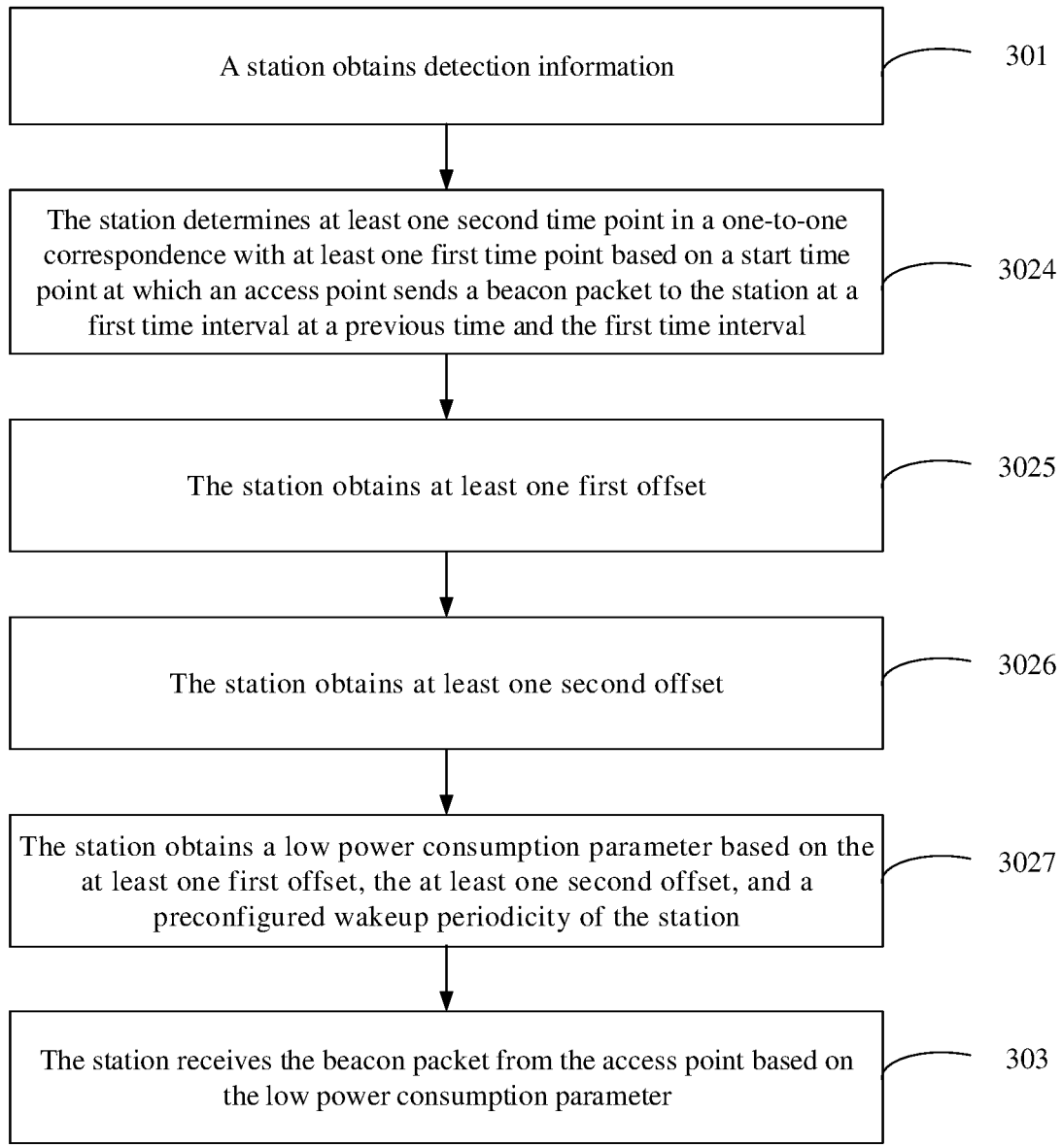
FIG. 7 is a schematic flowchart 3 of a Wi-Fi communication method according to an embodiment of this application.

When the low power consumption parameter includes the actual wakeup period of the station and the actual receive window length within which the station receives the beacon packet, for a specific process in which the station obtains the low power consumption parameter based on the detection information and the first time interval, refer to the following method shown in FIG. 6 or FIG. 7. When the low power consumption parameter includes the actual wakeup period of the station, for a specific process in which the station obtains the low power consumption parameter based on the detection information and the first time interval, refer to the method shown in FIG. 8 or FIG. 9.

Step 303: The station receives the beacon packet from the access point based on the low power consumption parameter.

For example, the low power consumption parameter includes the actual wakeup period of the station and the actual receive window length within which the station receives the beacon packet. The station transitions from the sleep state to the awake state based on the actual wakeup period of the station, and transitions from the awake state to the sleep state after the actual receive window length within which the station receives the beacon packet.

For example, the low power consumption parameter includes the actual wakeup period of the station. The station transitions from the sleep state to the awake state based on the actual wakeup period of the station.

In the method shown in FIG. 3, the station may obtain the detection information, obtain the low power consumption parameter based on the detection information and the first time interval, and receive the beacon packet from the access point based on the low power consumption parameter. In this way, the station adjusts the actual wakeup period of the station based on the detected at least one first time point and the first time interval, so that the actual wakeup period of the station is greater than or equal to the preconfigured wakeup period of the station, to reduce power consumption of the station.

Further, optionally, as shown in FIG. 6, in a possible implementation of the method shown in FIG. 3, the low power consumption parameter includes an actual wakeup period of the station and an actual receive window length within which the station receives the beacon packet, and the detection information includes the at least one first time point. Step 302 shown in FIG. 3 may be replaced by step 3021 to step 3023.

Step 3021: The station determines at least one second time point in a one-to-one correspondence with the at least one first time point based on a start time point at which the access point previously started to send the beacon packet to the station at the first time interval and the first time interval.

One second time point is a start time point at which the access point starts to send the beacon packet to the station at the second time interval for one time.

Optionally, if there is only one second time point, the station determines that a sum of a time point at which the access point previously started to send the beacon packet to the station at the first time interval and the first time interval is the second time point. A first time point corresponding to the second time point is a time point at which the access point actually starts to send the beacon packet to the station for a first time after the access point previously actually sends the beacon packet to the station. For example, the first time interval and the second time interval shown in FIG. 4 are used as examples. If the time point at which the access point previously started to send the beacon packet to the station at the first time interval is P1, and a time point at which the access point previously actually sends the beacon packet to the station is S1, the second time point is P2, and the first time point corresponding to the second time point is S2.

Optionally, if there are a plurality of second time points, the station determines that a sum of the time point at which the access point sends the beacon packet to the station at the first time interval at the previous time and the first time interval is a 1st second time point. A 1st first time point corresponding to the 1st second time point is a time point at which the access point starts to send the beacon packet to the station for a first time after the access point previously sends the beacon packet to the station. The station determines that a sum of the 1st second time point and the first time interval is a 2nd second time point. A 2nd first time point corresponding to the 2nd second time point is a time point at which the access point starts to send the beacon packet to the station for a first time after the 1st first time. The station determines that a sum of the 2nd second time point and the first time interval is a 3rd second time point. A 3rd first time point corresponding to the 3rd second time point is a time point at which the access point starts to send the beacon packet to the station for a first time after the 2nd first time, and so on.

Step 3022: The station obtains at least one first offset.

Each first offset is an offset of a first time point relative to a second time point corresponding to the first time point. For example, the detection information includes two first time points, a 1st first time point corresponds to a 1st second time point, and a 2nd first time point corresponds to a 2nd second time point. In step 3022, the station obtains two first offsets. A 1st first offset is an offset of the 1st first time point relative to the 1st second time point, and a 2nd first offset is an offset of the 2nd first time point relative to the 2nd second time point.

Optionally, the first offset includes a first pre-positioned offset or a first post-positioned offset. When the first time point is less than or equal to the second time point, the first offset includes the first pre-positioned offset. When the first time point is greater than or equal to the second time point, the first offset includes the first post-positioned offset.

Step 3023: The station obtains the low power consumption parameter based on the at least one first offset and a preconfigured wakeup period of the station.

The preconfigured wakeup period of the station is obtained based on the first time interval. For example, the preconfigured wakeup period of the station is the same as the first time interval.

Optionally, there is a correspondence between the first offset and an actual wakeup period of the station. The actual wakeup period is an integer multiple of the preconfigured wakeup period.

It can be understood that a larger first offset indicates a larger offset between the second time interval and the first time interval. In other words, poorer performance of the access point leads to a smaller actual wakeup period of the station. A smaller first offset indicates a smaller offset between the second time interval and the first time interval. In other words, better performance of the access point leads to a larger actual wakeup period of the station.

For example, a correspondence between the first offset and the actual wakeup period of the station may be shown in Table 1, and the preconfigured wakeup period is 100 ms. In Table 1, when the first offset is greater than or equal to A and less than B, the actual wakeup period of the station is 500 ms; when the first offset is greater than or equal to B and less than C, the actual wakeup period of the station is 400 ms; when the first offset is greater than or equal to C and less than D, the actual wakeup period of the station is 300 ms; and when the first offset is greater than or equal to D and less than or equal to E, the actual wakeup period of the station is 200 ms. Herein, A<B<C<D<E.

TABLE 1

| First offset | Actual wakeup period of a station |
|---|---|
| [A, B) | 500 ms |
| [B, C) | 400 ms |
| [C, D) | 300 ms |
| [D, E] | 200 ms |

It should be noted that, Table 1 merely shows an example of the correspondence between the first offset and the actual wakeup period of the station. The correspondence between the first offset and the actual wakeup period of the station may alternatively be in another form. This is not limited.

It can be understood that, when the station obtains two or more first offsets, the station may first obtain an average value of the two or more first offsets, a largest value of the two or more first offsets, a smallest value of the two or more first offsets, or the like, use the average value of the two or more first offsets, the largest value of the two or more first offsets, the smallest value of the two or more first offsets, or the like as the first offset, and determine the actual wakeup period of the station based on the correspondence between the first offset and the actual wakeup period of the station.

Optionally, the actual receive window length within which the station receives the beacon packet may be greater than or equal to a sum of a first optimized pre-positioned offset and a first optimized post-positioned offset.

The first optimized pre-positioned offset may be a largest offset in at least one first pre-positioned offset; or the first optimized pre-positioned offset may be a smallest offset in at least one first pre-positioned offset; or the first optimized pre-positioned offset may be an average value of at least one first pre-positioned offset.

The first optimized post-positioned offset may be a largest offset in at least one first post-positioned offset; or the first optimized post-positioned offset may be a smallest offset in at least one first post-positioned offset; or the first optimized post-positioned offset may be an average value of at least one first post-positioned offset.

It can be understood that, to improve a success rate of receiving the beacon packet by the station, the station may wake up before a wakeup moment in the actual wakeup period of the station. For example, the station wakes up at a moment that is a first reserved offset earlier than the wakeup moment in the actual wakeup period of the station. The first reserved offset is greater than or equal to the first optimized pre-positioned offset. For example, if the actual wakeup period of the station is 100 ms, the first reserved offset is 1 ms, and the wakeup moment of the station in the actual wakeup period of the station is a 100th ms, a 200th ms, a 300th ms, . . . , to improve the success rate of receiving the beacon packet by the station, the station may wake up at a 99th ms, a 199th ms, a 299th ms, . . . .

For example, the first offset shown in Table 2 is used as an example. Herein, - indicates a pre-positioned offset, and + indicates a post-positioned offset. If the first optimized pre-positioned offset is the largest offset in the at least one first pre-positioned offset, and the first optimized post-positioned offset is the largest offset in the at least one first post-positioned offset, in Table 2, the first optimized pre-positioned offset is 6.45 ms, and the first optimized post-positioned offset is 8.33 ms. Therefore, the actual receive window length within which the station receives the beacon packet is greater than or equal to 14.78 ms, and the first reserved offset is greater than or equal to 6.45 ms.

TABLE 2

| First offset (ms) | +4.55 | −3.22 | −2.12 | +2.09 | +3.22 | +8.33 | −6.45 |
|---|---|---|---|---|---|---|---|

Optionally, the actual receive window length within which the station receives the beacon packet is greater than or equal to a first optimized pre-positioned offset.

The first optimized pre-positioned offset may be a largest offset in at least one first pre-positioned offset; or the first optimized pre-positioned offset may be a smallest offset in at least one first pre-positioned offset; or the first optimized pre-positioned offset may be an average value of at least one first pre-positioned offset.

It can be understood that, to improve a success rate of receiving the beacon packet by the station, the station may wake up before a wakeup moment in the actual wakeup period of the station. For example, the station wakes up at a moment that is a second reserved offset earlier than the wakeup moment in the actual wakeup period of the station. The second reserved offset is greater than or equal to the first optimized pre-positioned offset.

Optionally, the actual receive window length within which the station receives the beacon packet is greater than or equal to a first optimized post-positioned offset.

The first optimized post-positioned offset may be a largest offset in at least one first post-positioned offset; or the first optimized post-positioned offset may be a smallest offset in at least one first post-positioned offset; or the first optimized post-positioned offset may be an average value of at least one first post-positioned offset.

It can be understood that, to improve a success rate of receiving the beacon packet by the station, the station may wake up before a wakeup moment in the actual wakeup period of the station. For example, the station wakes up at a moment that is a third reserved offset earlier than the wakeup moment in the actual wakeup period of the station. For example, the station may wake up at a moment that is 1.6 ms earlier than the wakeup moment in the actual wakeup period of the station.

In the method shown in FIG. 6, the station may adjust the actual wakeup period of the station based on the detected at least one first time point and the first time interval. When the first offset is large, the actual wakeup period of the station is small, and power consumption of the station is large; and when the first offset is small, the actual wakeup period of the station is large, and power consumption of the station is small. Therefore, the station may adjust the actual wakeup period of the station based on a detection result, so that the station has a minimum power consumption when the success rate of receiving the beacon packet by the station is ensured. In addition, the station may further determine the actual receive window length within which the station receives the beacon packet, to improve the success rate of receiving the beacon packet by the station.

Further, optionally, as shown in FIG. 7, in a possible implementation of the method shown in FIG. 3, the low power consumption parameter includes an actual wakeup period of the station and an actual receive window length within which the station receives the beacon packet, and the detection information includes the at least one first time point and the at least one third time point. Step 302 shown in FIG. 3 may be replaced by step 3024 to step 3027.

Step 3024: The station determines at least one second time point in a one-to-one correspondence with the at least one first time point based on a start time point at which the access point previously started to send the beacon packet to the station at the first time interval and the first time interval.

Step 3025: The station obtains at least one first offset.

For specific descriptions of step 3024 and step 3025, refer to corresponding descriptions of step 3021 and step 3022. Details are not described again.

Step 3026: The station obtains at least one second offset.

Each second offset is an offset of a third time point relative to a fourth time point corresponding to the third time point.

Optionally, the second offset includes a second pre-positioned offset or a second post-positioned offset. When the third time point is less than or equal to the fourth time point, the second offset includes the second pre-positioned offset. When the third time point is greater than or equal to the fourth time point, the second offset includes the second post-positioned offset.

Step 3027: The station obtains the low power consumption parameter based on the at least one first offset, the at least one second offset, and a preconfigured wakeup period of the station.

The preconfigured wakeup period of the station is obtained based on the first time interval. For example, the preconfigured wakeup period of the station is the same as the first time interval.

Optionally, there is a correspondence among the first offset, the second offset, and an actual wakeup period of the station. The actual wakeup period is an integer multiple of the preconfigured wakeup period.

It can be understood that a larger first offset and a larger second offset indicate a larger offset between the second time interval and the first time interval. In other words, poorer performance of the access point leads to a smaller actual wakeup period of the station. A smaller first offset and a smaller second offset indicate a smaller offset between the second time interval and the first time interval. In other words, better performance of the access point leads to a larger actual wakeup period of the station.

For example, the correspondence among the first offset, the second offset, and the actual wakeup period of the station may be shown in Table 3, and the preconfigured wakeup period is 100 ms. In Table 3, when the first offset is greater than or equal to A and less than B, and the second offset is greater than or equal to F and less than G, the actual wakeup period of the station is 500 ms; when the first offset is greater than or equal to B and less than C, and the second offset is greater than or equal to G and less than H, the actual wakeup period of the station is 400 ms; when the first offset is greater than or equal to C and less than D, and the second offset is greater than or equal to H and less than I, the actual wakeup period of the station is 300 ms; and when the first offset is greater than or equal to D and less than or equal to E, and the second offset is greater than or equal to I and less than or equal to J, the actual wakeup period of the station is 200 ms. Herein, A<B<C<D<E, and F<G<H<I<J.

TABLE 3

| First offset | Second offset | Actual wakeup period of a station |
| --- | --- | --- |
| [A, B) | [F, G) | 500 ms |
| [B, C) | [G, H) | 400 ms |
| [C, D) | [H, I) | 300 ms |
| [D, E] | [I, J] | 200 ms |

It should be noted that, Table 3 merely shows an example of the correspondence among the first offset, the second offset, and the actual wakeup period of the station. The correspondence among the first offset, the second offset, and the actual wakeup period of the station may alternatively be in another form. This is not limited.

It can be understood that, when the station obtains two or more first offsets and two or more second offsets, the station may first obtain an average value of the two or more first offsets, a largest value of the two or more first offsets, a smallest value of the two or more first offsets, or the like, and an average value of the two or more second offsets, a largest value of the two or more second offsets, a smallest value of the two or more second offsets, or the like; use the average value of the two or more first offsets, the largest value of the two or more first offsets, the smallest value of the two or more first offsets, or the like as the first offset; use the average value of the two or more second offsets, the largest value of the two or more second offsets, the smallest value of the two or more second offsets, or the like as the second offset; and determine the actual wakeup period of the station based on the first offset, the second offset, and the correspondence among the first offset, the second offset, and the actual wakeup period of the station.

Optionally, the actual receive window length within which the station receives the beacon packet is greater than or equal to a sum of a largest value of the first optimized pre-positioned offset and the second optimized pre-positioned offset and a largest value of the first optimized post-positioned offset and the second optimized post-positioned offset.

For descriptions of the first optimized pre-positioned offset and the first optimized post-positioned offset, refer to the descriptions of step 3023. Details are not described again.

The second optimized pre-positioned offset may be a largest offset in at least one second pre-positioned offset; or the second optimized pre-positioned offset may be a smallest offset in at least one second pre-positioned offset; or the second optimized pre-positioned offset may be an average value of at least one second pre-positioned offset.

The second optimized post-positioned offset may be a largest offset in at least one second post-positioned offset; or the second optimized post-positioned offset may be a smallest offset in at least one second post-positioned offset; or the second optimized post-positioned offset may be an average value of at least one second post-positioned offset.

It can be understood that, to improve a success rate of receiving the beacon packet by the station, the station may wake up before a wakeup moment in the actual wakeup period of the station. For example, the station wakes up at a moment that is a fourth reserved offset earlier than the wakeup moment in the actual wakeup period of the station. The fourth reserved offset is greater than or equal to the largest value of the first optimized pre-positioned offset and the second optimized pre-positioned offset.

For example, the first offset and the second offset shown in Table 4 are used as examples. Herein, - represents a pre-positioned offset, and + represents a post-positioned offset. If the first optimized pre-positioned offset is a largest offset in at least one first pre-positioned offset, the first optimized post-positioned offset is a largest offset in at least one first post-positioned offset, the second optimized pre-positioned offset is a largest offset in at least one second pre-positioned offset, and the second optimized post-positioned offset is a largest offset in at least one second post-positioned offset, in Table 4, the first optimized pre-positioned offset is 6.45 ms, the first optimized post-positioned offset is 8.33 ms, the second optimized pre-positioned offset is 6.56 ms, and the second optimized post-positioned offset is 7.23. Therefore, the actual receive window length within which the station receives the beacon packet is greater than or equal to 14.89 ms (6.56 ms+8.33 ms), and the fourth reserved offset is greater than or equal to 6.56 ms.

TABLE 4

| First offset (ms) | +4.55 | −3.22 | −2.12 | +2.09 | +3.22 | +8.33 | −6.45 |
| Second offset (ms) | +3.78 | +6.88 | +3.99 | −2.12 | −5.89 | −6.56 | +7.23 |

Optionally, the actual receive window length within which the station receives the beacon packet is greater than or equal to a largest value of the first optimized pre-positioned offset and the second optimized pre-positioned offset.

For a specific description of the first optimized pre-positioned offset, refer to the descriptions of step 3023. Details are not described again.

The second optimized pre-positioned offset may be a largest offset in at least one second pre-positioned offset; or the second optimized pre-positioned offset may be a smallest offset in at least one second pre-positioned offset; or the second optimized pre-positioned offset may be an average value of at least one second pre-positioned offset.

It can be understood that, to improve a success rate of receiving the beacon packet by the station, the station may wake up before a wakeup moment in the actual wakeup period of the station. For example, the station wakes up at a moment that is a fifth reserved offset earlier than the wakeup moment in the actual wakeup period of the station. The fifth reserved offset is greater than or equal to the largest value of the first optimized pre-positioned offset and the second optimized pre-positioned offset.

Optionally, the actual receive window length within which the station receives the beacon packet is greater than or equal to a largest value of the first optimized post-positioned offset and the second optimized post-positioned offset.

For a specific description of the first optimized post-positioned offset, refer to the descriptions of step 3023. Details are not described again.

The second optimized post-positioned offset may be a largest offset in at least one second post-positioned offset; or the second optimized post-positioned offset may be a smallest offset in at least one second post-positioned offset; or the second optimized post-positioned offset may be an average value of at least one second post-positioned offset.

It can be understood that, to improve a success rate of receiving the beacon packet by the station, the station may wake up before a wakeup moment in the actual wakeup period of the station. For example, the station may wake up at a moment that is 1.6 ms earlier than the wakeup moment in the actual wakeup period of the station.

In the method shown in FIG. 7, the station may adjust the actual wakeup period of the station based on the detected at least one first time point, the at least one third time point, at least one fourth time point at which the station performs an indication, and the first time interval. When the first offset and the second offset are large, the actual wakeup period of the station is small, and power consumption of the station is large; and when the first offset and the second offset are small, the actual wakeup period of the station is large, and power consumption of the station is small. Therefore, the station may adjust the actual wakeup period of the station based on a detection result, so that the station has a minimum power consumption when a success rate of receiving the beacon packet by the station is ensured. In addition, the station may further determine the actual receive window length within which the station receives the beacon packet, to improve the success rate of receiving the beacon packet by the station.

Figure 8:
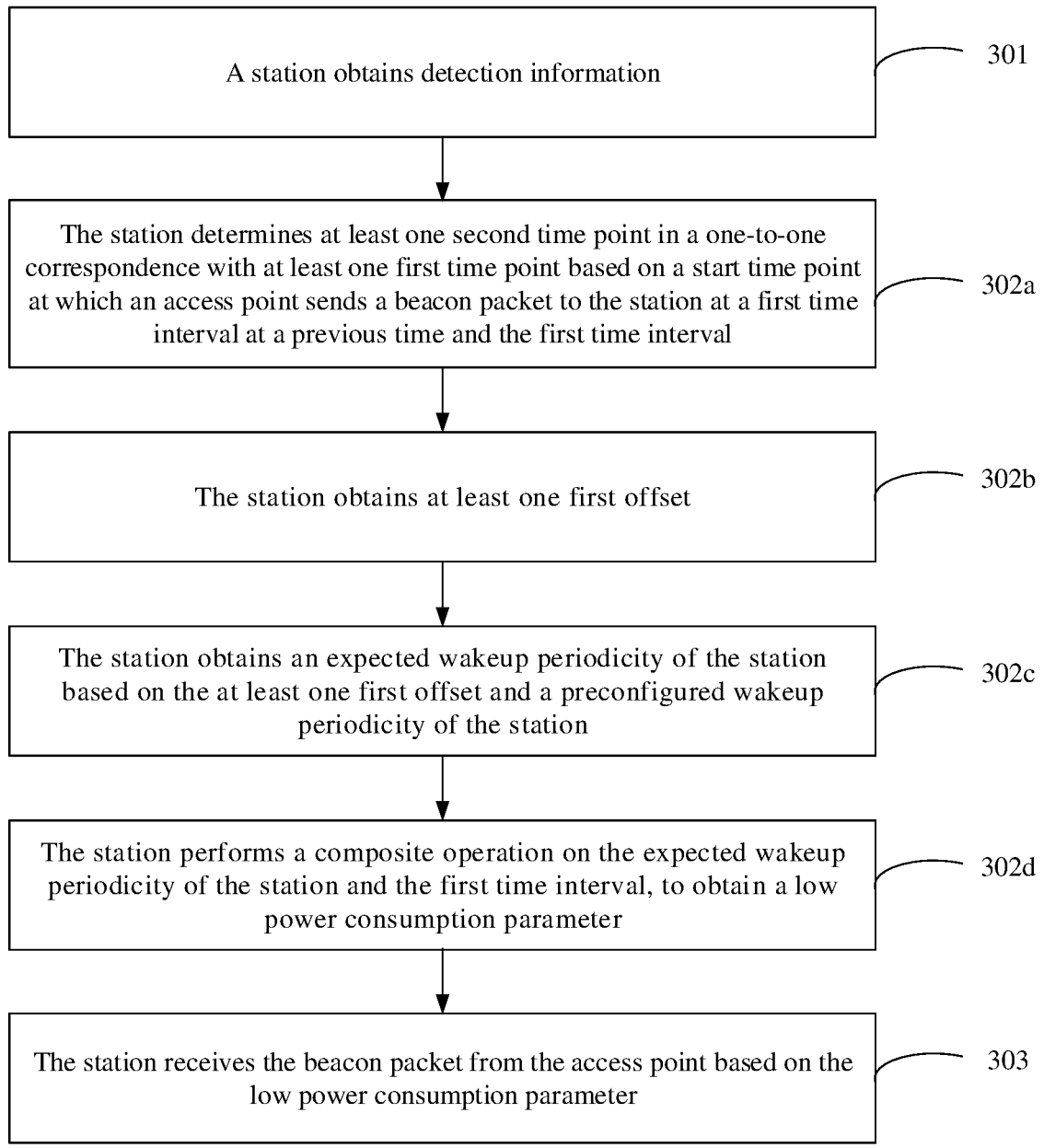
FIG. 8 is a schematic flowchart 4 of a Wi-Fi communication method according to an embodiment of this application.

Further, optionally, as shown in FIG. 8, in a possible implementation of the method shown in FIG. 3, the low power consumption parameter includes an actual wakeup period of the station, and the detection information includes the at least one first time point. Step 302 shown in FIG. 3 may be replaced by step 302*a* to step 302*d*.

Step 302*a*: The station determines at least one second time point in a one-to-one correspondence with the at least one first time point based on a start time point at which the access point previously started to send the beacon packet to the station at the first time interval and the first time interval.

Step 302*b*: The station obtains at least one first offset.

For specific descriptions of step 302*a* and step 302*b*, refer to corresponding descriptions of step 3021 and step 3022. Details are not described again.

Step 302*c*: The station obtains an expected wakeup period of the station based on the at least one first offset and a preconfigured wakeup period of the station.

There is a correspondence between the expected wakeup period of the station and the first offset. The expected wakeup period of the station is greater than or equal to the preconfigured wakeup period. For the correspondence between the expected wakeup period of the station and the first offset, refer to a correspondence between the actual wakeup period of the station and the first offset. Details are not described.

It can be understood that a larger first offset indicates a larger offset between the second time interval and the first time interval. In other words, poorer performance of the access point leads to a smaller expected wakeup period of the station. A smaller first offset indicates a smaller offset between the second time interval and the first time interval. In other words, better performance of the access point leads to a larger expected wakeup period of the station.

In addition to the method shown in step 302a to step 302c, when the detection information includes a plurality of first time points, the station may calculate a difference between every two adjacent first time points in the plurality of first time points, namely, a third offset; and the station obtains the expected wakeup period of the station based on the third offset and the preconfigured wakeup period.

It can be understood that, a larger difference between a largest third offset and a smallest third offset in a plurality of third offsets calculated by the station indicates a more unstable time interval at which the access point sends the beacon packet to the station. In other words, poorer performance of the access point leads to a smaller expected wakeup period of the station. A smaller difference between the largest third offset and the smallest third offset indicates a more stable time interval at which the access point sends the beacon packet to the station. In other words, better performance of the access point leads to a larger expected wakeup period of the station.

Optionally, there is a correspondence between the expected wakeup period of the station and a difference between the largest third offset and the smallest third offset, and the expected wakeup period of the station is greater than or equal to the preconfigured wakeup period. For example, the correspondence between the expected wakeup period of the station and the difference between the largest third offset and the smallest third offset may be shown in Table 5. In Table 5, when the difference between the largest third offset and the smallest third offset is greater than or equal to a and less than b, the expected wakeup period of the station is 500 ms; when the difference between the largest third offset and the smallest third offset is greater than or equal to b and less than c, the expected wakeup period of the station is 400 ms; when the difference between the largest third offset and the smallest third offset is greater than or equal to c and less than d, the expected wakeup period of the station is 300 ms; and when the difference between the largest third offset and the smallest third offset is greater than or equal to d and less than or equal to e, the expected wakeup period of the station is 200 ms. Herein, a<b<c<d<e.

TABLE 5

| Difference between a largest third offset and a smallest third offset | Expected wakeup period of a station |
| --- | --- |
| [a, b) | 500 ms |
| [b, c) | 400 ms |
| [c, d) | 300 ms |
| [d, e] | 200 ms |

It should be noted that, Table 5 merely shows an example of the correspondence between the expected wakeup period of the station and the difference between the largest third offset and the smallest third offset. The correspondence between the expected wakeup period of the station and the difference between the largest third offset and the smallest third offset may alternatively be in another form. This is not limited.

It should be noted that the expected wakeup period of the station may alternatively be set by a user based on a requirement.

Step 302d: The station performs a composite operation on the expected wakeup period of the station and the first time interval, to obtain the low power consumption parameter.

The low power consumption parameter includes the actual wakeup period of the station.

$$T = \lfloor t_1/t_2 \rfloor * t_2.$$

Optionally, Herein, T is the actual wakeup period of the station, $t_1$ is the expected wakeup period of the station, $t_2$ is the first time interval, and ⌊ ⌋ is a rounding down symbol. For example, $t_1$ is 1000 ms, and $t_2$ is 300 ms. T is 900 ms.

In the method shown in FIG. 8, the station may obtain the expected wakeup period of the station based on the detected at least one first time point and the first time interval, and calculate the actual wakeup period of the station based on the expected wakeup period of the station. When the first offset is large, the expected wakeup period of the station is small, the actual wakeup period that is of the station and that is obtained based on the expected wakeup period of the station is also small, and power consumption of the station is large; and when the first offset is small, the expected wakeup period of the station is large, the actual wakeup period that is of the station and that is obtained based on the expected wakeup period of the station is large, and the power consumption of the station is small. Therefore, the station may adjust the actual wakeup period of the station based on a detection result, so that the station has a minimum power consumption when a success rate of receiving the beacon packet by the station is ensured.

Figure 9:
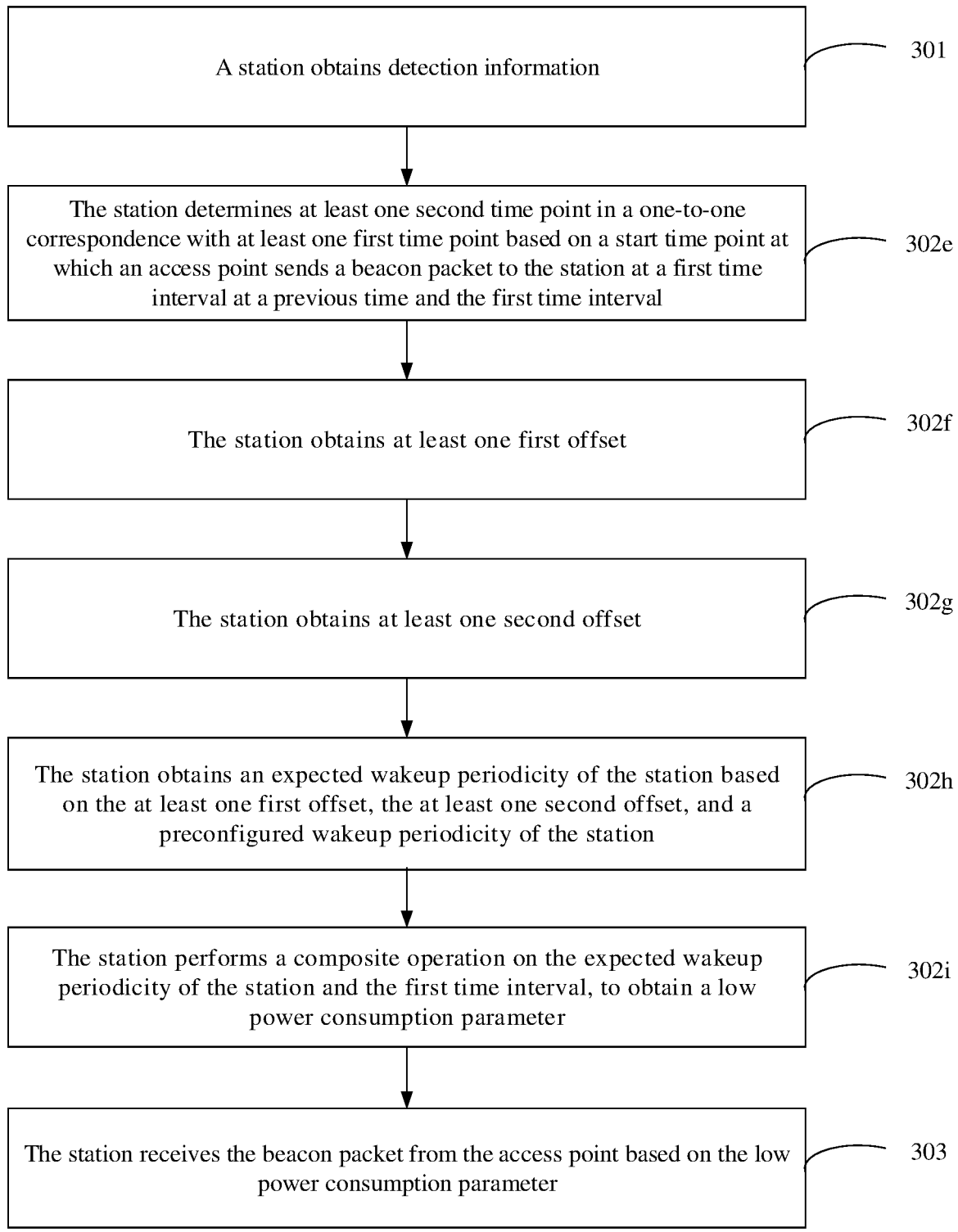
FIG. 9 is a schematic flowchart 5 of a Wi-Fi communication method according to an embodiment of this application.

Further, optionally, as shown in FIG. 9, in a possible implementation of the method shown in FIG. 3, the low power consumption parameter includes an actual wakeup period of the station, and the detection information includes the at least one first time point and the at least one third time point. Step 302 shown in FIG. 3 may be replaced by step 302e to step 302i.

Step 302e: The station determines at least one second time point in a one-to-one correspondence with the at least one first time point based on a start time point at which the access point previously started to send the beacon packet to the station at the first time interval and the first time interval.

Step 302f: The station obtains at least one first offset.

Step 302g: The station obtains at least one second offset.

For specific descriptions of step 302e and step 302g, refer to corresponding descriptions of step 3024 and step 3026. Details are not described again.

Step 302h: The station obtains an expected wakeup period of the station based on the at least one first offset, the at least one second offset, and a preconfigured wakeup period of the station.

Optionally, there is a correspondence between the first offset, the second offset, and the expected wakeup period of the station. The expected wakeup period of the station is greater than or equal to the preconfigured wakeup period. For the correspondence between the first offset, the second offset, and the expected wakeup period of the station, refer to a correspondence between the first offset, the second offset, and the actual wakeup period of the station. Details are not described.

It can be understood that a larger first offset and a larger second offset indicate poor performance of the access point.

Therefore, the expected wakeup period of the station is smaller. A smaller first offset and a smaller second offset indicate good performance of the access point. Therefore, the expected wakeup period of the station is larger.

In addition to the method shown in step 302e to step 302h, when the detection information includes a plurality of first time points and a plurality of third time points, the station may calculate a difference between every two adjacent first time points in the plurality of first time points, namely, a third offset, and calculate a difference between every two adjacent third time points in the plurality of third time points, namely, a fourth offset. The station obtains the expected wakeup period of the station based on the third offset, the fourth offset, and the preconfigured wakeup period.

It can be understood that, in a plurality of third offsets and a plurality of fourth offsets calculated by the station, a larger difference between a largest third offset and a smallest third offset and a larger difference between a largest fourth offset and a smallest fourth offset indicate a more unstable time interval at which the access point sends the beacon packet to the station. In other words, poorer performance of the access point leads to a smaller expected wakeup period of the station. A smaller difference between the largest third offset and the smallest third offset and a smaller difference between the largest fourth offset and the smallest fourth offset indicate a more stable time interval at which the access point sends the beacon packet to the station. In other words, better performance of the access point leads to a larger expected wakeup period of the station.

Optionally, there is a correspondence among a difference between the largest third offset and the smallest third offset, a difference between the largest fourth offset and the smallest fourth offset, and the expected wakeup period of the station. For example, the correspondence among the difference between the largest third offset and the smallest third offset, the difference between the largest fourth offset and the smallest fourth offset, and the expected wakeup period of the station may be shown in Table 6. In Table 6, when the difference between the largest third offset and the smallest third offset is greater than or equal to a and less than b, and the difference between the largest fourth offset and the smallest fourth offset is greater than or equal to f and less than g, the expected wakeup period of the station is 500 ms; when the difference between the largest third offset and the smallest third offset is greater than or equal to b and less than c, and the difference between the largest fourth offset and the smallest fourth offset is greater than or equal to g and less than h, the expected wakeup period of the station is 400 ms; when the difference between the largest third offset and the smallest third offset is greater than or equal to c and less than d, and the difference between the largest fourth offset and the smallest fourth offset is greater than or equal to h and less than i, the expected wakeup period of the station is 300 ms; and when the difference between the largest third offset and the smallest third offset is greater than or equal to d and less than or equal to e, and the difference between the largest fourth offset and the smallest fourth offset is greater than or equal to i and less than or equal to j, the expected wakeup period of the station is 200 ms. Herein, $a<b<c<d<e$, and $f<g<h<i<j$.

TABLE 6

| Difference between a largest third offset and a smallest third offset | Difference between a largest fourth offset and a smallest fourth offset | Expected wakeup period of a station |
|---|---|---|
| [a, b) | [f, g) | 500 ms |
| [b, c) | [g, h) | 400 ms |
| [c, d) | [h, i) | 300 ms |
| [d, e] | [i, j] | 200 ms |

It should be noted that, Table 6 merely shows an example of the correspondence among the difference between the largest third offset and the smallest third offset, the difference between the largest fourth offset and the smallest fourth offset, and the expected wakeup period of the station. The correspondence among the difference between the largest third offset and the smallest third offset, the difference between the largest fourth offset and the smallest fourth offset, and the expected wakeup period of the station may alternatively be in another form. This is not limited. It should be noted that the expected wakeup period of the station may alternatively be set by a user based on a requirement.

Step 302i: The station performs a composite operation on the expected wakeup period of the station and the first time interval, to obtain the low power consumption parameter.

For a description of step 302i, refer to the corresponding description of step 302d. Details are not described again.

In the method shown in FIG. 9, the station may obtain the expected wakeup period of the station based on the detected at least one first time point, the detected at least one third time point, and the first time interval, and calculate the actual wakeup period of the station based on the expected wakeup period of the station. When the first offset and the second offset are large, the expected wakeup period of the station is small, the actual wakeup period that is of the station and that is obtained based on the expected wakeup period of the station is also small, and power consumption of the station is large; and when the first offset and the second offset are small, the expected wakeup period of the station is large, the actual wakeup period that is of the station and that is obtained based on the expected wakeup period of the station is large, and the power consumption of the station is small. Therefore, the station may adjust the actual wakeup period of the station based on a detection result, so that the station has a minimum power consumption when a success rate of receiving the beacon packet by the station is ensured.

It can be understood that, to achieve the foregoing functions, the station, or the like includes a corresponding hardware structure and/or software module for implementing each function. A person skilled in the art should be easily aware that, in combination with units and algorithm operations of the examples described in embodiments disclosed in this specification, this application can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the station may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 10:
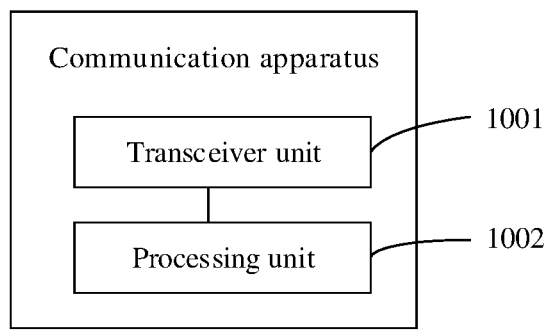
FIG. 10 is a schematic diagram of a structure of a communication apparatus according to an embodiment of this application.

For example, when functional modules are obtained through division in an integrated manner, FIG. 10 is a schematic diagram of a structure of a communication apparatus. The communication apparatus may be a chip or a system on chip in the foregoing station, or another combination component, a component, or the like that may implement a function of the station. The communication apparatus may be configured to perform the function of the station in the foregoing embodiments.

In a possible implementation, the communication apparatus shown in FIG. 10 includes a transceiver unit 1001 and a processing unit 1002.

The transceiver unit 1001 is configured to obtain detection information. The detection information includes at least one first time point, and the first time point is a start time point at which an access point actually starts to send a beacon packet to the communication apparatus for one time.

The processing unit 1002 is configured to obtain a low power consumption parameter based on the detection information and a first time interval. The first time interval is a preconfigured time interval at which the access point sends the beacon packet to the communication apparatus, the low power consumption parameter includes an actual wakeup period of the communication apparatus and an actual receive window length within which the communication apparatus receives the beacon packet, or the low power consumption parameter includes an actual wakeup period of the communication apparatus, and the actual wakeup period of the communication apparatus is greater than a preconfigured wakeup period of the communication apparatus.

The processing unit 1002 is further configured to receive the beacon packet from the access point based on the low power consumption parameter.

Optionally, the processing unit 1002 is specifically configured to determine at least one second time point in a one-to-one correspondence with the at least one first time point based on a start time point at which the access point previuiously starts to send the beacon packet to the communication apparatus at the first time interval and the first time interval. One second time point is a start time point at which the access point starts to send the beacon packet to the communication apparatus at the first time interval for one time. The processing unit 1002 is further specifically configured to obtain the low power consumption parameter based on the detection information, the at least one second time point, and the preconfigured wakeup period of the communication apparatus. The preconfigured wakeup period of the communication apparatus is the same as the first time interval.

Optionally, the low power consumption parameter includes the actual wakeup period of the communication apparatus and the actual receive window length within which the communication apparatus receives the beacon packet. The processing unit 1002 is specifically configured to obtain at least one first offset. Each first offset is an offset of a first time point relative to a second time point corresponding to the first time point. The processing unit 1002 is further specifically configured to obtain the low power consumption parameter based on the at least one first offset and the preconfigured wakeup period of the communication apparatus. There is a correspondence between the first offset and the actual wakeup period of the communication apparatus.

Optionally, the low power consumption parameter includes the actual wakeup period of the communication apparatus. The processing unit 1002 is specifically configured to obtain at least one first offset. Each first offset is an offset of a first time point relative to a second time point corresponding to the first time point. The processing unit 1002 is further specifically configured to obtain an expected wakeup period of the communication apparatus based on the at least one first offset and the preconfigured wakeup period of the communication apparatus. There is a correspondence between the expected wakeup period of the communication apparatus and the first offset. The processing unit 1002 is further specifically configured to perform a composite operation on the expected wakeup period of the communication apparatus and the first time interval, to obtain the low power consumption parameter.

Optionally, the detection information further includes at least one third time point, one third time point is a start time point at which the access point actually starts to send a response packet to the communication apparatus for one time, one third time point corresponds to one fourth time point, and the fourth time point is a start time point at which the communication apparatus indicates the access point to start to send the response packet to the communication apparatus.

Optionally, the low power consumption parameter includes the actual wakeup period of the communication apparatus and the actual receive window length within which the communication apparatus receives the beacon packet. The processing unit 1002 is specifically configured to obtain at least one first offset. Each first offset is an offset of a first time point relative to a second time point corresponding to the first time point. The processing unit 1002 is further specifically configured to obtain at least one second offset. Each second offset is an offset of a third time point relative to a fourth time point corresponding to the third time point. The processing unit 1002 is further specifically configured to obtain the low power consumption parameter based on the at least one first offset, the at least one second offset, and the preconfigured wakeup period of the communication apparatus. There is a correspondence among the first offset, the second offset, and the actual wakeup period of the communication apparatus.

Optionally, the low power consumption parameter includes the actual wakeup period of the communication apparatus. The processing unit 1002 is specifically configured to obtain at least one first offset. Each first offset is an offset of a first time point relative to a second time point corresponding to the first time point. The processing unit 1002 is further specifically configured to obtain at least one second offset. Each second offset is an offset of a third time point relative to a fourth time point corresponding to the third time point. The processing unit 1002 is further specifically configured to obtain an expected wakeup period of the communication apparatus based on the at least one first offset, the at least one second offset, and the preconfigured wakeup period of the communication apparatus. There is a correspondence among the first offset, the second offset, and the expected wakeup period of the communication apparatus. The processing unit 1002 is further specifically configured to perform a composite operation on the expected wakeup period of the communication apparatus and the first time interval, to obtain the low power consumption parameter.

All related content of the operations in the foregoing method embodiments may be cited in function descriptions of the corresponding functional modules. Details are not described herein again.

In this embodiment, the communication apparatus is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus may be in a form shown in FIG. 2.

For example, the processor 201 in FIG. 2 may invoke the computer-executable instructions stored in the memory 203, so that the communication apparatus performs the Wi-Fi communication method in the foregoing method embodiment.

For example, functions/implementation processes of the transceiver unit 1001 and the processing unit 1002 in FIG. 10 may be implemented by invoking the computer-executable instructions stored in the memory 203 by the processor 201 in FIG. 2. Alternatively, a function/implementation process of the processing unit 1002 in FIG. 10 may be implemented by invoking the computer-executable instructions stored in the memory 203 by the processor 201 in FIG. 2, and a function/implementation process of the transceiver unit 1001 in FIG. 10 may be implemented by using the communication interface 204 in FIG. 2.

Because the communication apparatus provided in this embodiment may perform the Wi-Fi communication method, for technical effects that can be obtained by the communication apparatus, refer to the foregoing method embodiment. Details are not described herein again.

Based on the foregoing descriptions of the implementations, a person skilled in the art may clearly understand that for the purpose of convenient and brief descriptions, division into the foregoing functional modules is merely used as an example for descriptions. During an actual application, the foregoing functions can be allocated to different functional modules for implementation based on a requirement, in other words, an inner structure of an apparatus is divided into different functional modules to implement all or a part of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and
sold or used as an independent product, the integrated unit may be stored in a readable storage medium. Based on such understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of steps of methods in embodiments of this application. The foregoing storage medium includes any medium that can store program code, such as a USB flash drive, a removable hard disk, a ROM, a RAM, a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A wireless fidelity (Wi-Fi) communication method, wherein the method is applied to a station, and the method comprises:
   obtaining detection information, wherein the detection information comprises at least one first time point, and the first time point is a start time point at which an access point actually starts to send a beacon packet to the station for one time;
   obtaining a low power consumption parameter based on the detection information and a first time interval, wherein the first time interval is a preconfigured time interval at which the access point sends the beacon packet to the station, the low power consumption parameter comprises an actual wakeup period of the station and an actual receive window length within which the station receives the beacon packet, or the low power consumption parameter comprises an actual wakeup period of the station, and the actual wakeup period of the station is greater than a preconfigured wakeup period of the station; and
   receiving the beacon packet from the access point based on the low power consumption parameter,
   wherein the obtaining a low power consumption parameter based on the detection information and a first time interval comprises:
   determining at least one second time point in a one-to-one correspondence with the at least one first time point based on a stat time point at which the access point previously started to send the beacon packet to the station at the first time interval and the first time interval, wherein one second time point is a start time point at which the access point starts to send the beacon packet to the station at the first time interval for one time; and
   obtaining the low power consumption parameter based on the detection information, the at least one second time point, and the preconfigured wakeup period of the station, wherein the preconfigured wakeup period of the station is the same as the first time interval.

2. The method according to claim 1, wherein the low power consumption parameter comprises the actual wakeup period of the station and the actual receive window length within which the station receives the beacon packet; and
the obtaining the low power consumption parameter based on the detection information, the at least one second time point, and the preconfigured wakeup period of the station comprises:
obtaining at least one first offset, wherein each first offset is an offset of a first time point relative to a second time point corresponding to the first time point; and
obtaining the low power consumption parameter based on the at least one first offset and the preconfigured wakeup period of the station, wherein there is a correspondence between the at least one first offset and the actual wakeup period of the station.

3. The method according to claim 1, wherein the low power consumption parameter comprises the actual wakeup period of the station; and
the obtaining the low power consumption parameter based on the detection information, the at least one second time point, and the preconfigured wakeup period of the station comprises:
obtaining at least one first offset, wherein each first offset is an offset of a first time point relative to a second time point corresponding to the first time point;
obtaining an expected wakeup period of the station based on the at least one first offset and the preconfigured wakeup period of the station, wherein there is a correspondence between the expected wakeup period of the station and the at least one first offset; and
performing a composite operation on the expected wakeup period of the station and the first time interval, to obtain the low power consumption parameter.

4. The method according to claim 1, wherein the detection information further comprises at least one third time point, one third time point is a start time point at which the access point actually starts to send a response packet to the station for one time, one third time point corresponds to one fourth time point, and the fourth time point is a start time point at which the station indicates the access point to start to send the response packet to the station.

5. The method according to claim 4, wherein the low power consumption parameter comprises the actual wakeup period of the station and the actual receive window length within which the station receives the beacon packet; and
the obtaining the low power consumption parameter based on the detection information, the at least one second time point, and the preconfigured wakeup period of the station comprises:
obtaining at least one first offset, wherein each first offset is an offset of a first time point relative to a second time point corresponding to the first time point;
obtaining at least one second offset, wherein each second offset is an offset of a third time point relative to a fourth time point corresponding to the third time point; and
obtaining the low power consumption parameter based on the at least one first offset, the at least one second offset, and the preconfigured wakeup period of the station, wherein there is a correspondence among the at least one first offset, the at least one second offset, and the actual wakeup period of the station.

6. The method according to claim 4, wherein the low power consumption parameter comprises the actual wakeup period of the station; and
the obtaining the low power consumption parameter based on the detection information, the at least one second time point, and the preconfigured wakeup period of the station comprises:
obtaining at least one first offset, wherein each first offset is an offset of a first time point relative to a second time point corresponding to the first time point;
obtaining at least one second offset, wherein each second offset is an offset of a third time point relative to a fourth time point corresponding to the third time point;
obtaining an expected wakeup period of the station based on the at least one first offset, the at least one second offset, and the preconfigured wakeup period of the station, wherein there is a correspondence among the at least one first offset, the at least one second offset, and the expected wakeup period of the station; and
performing a composite operation on the expected wakeup period of the station and the first time interval, to obtain the low power consumption parameter.

7. A communication apparatus, comprising a transceiver and at least one processor, wherein
the transceiver is configured to obtain detection information, wherein the detection information comprises at least one first time point, and the first time point is a start time point at which an access point actually starts to send a beacon packet to the communication apparatus for one time
the at least one processor is configured to:
obtain a low power consumption parameter based on the detection information and a first time interval, wherein the first time interval is a preconfigured time interval at which the access point sends the beacon packet to the communication apparatus, the low power consumption parameter comprises an actual wakeup period of the communication apparatus and an actual receive window length within which the communication apparatus receives the beacon packet, or the low power consumption parameter comprises an actual wakeup period of the communication apparatus, and the actual wakeup period of the communication apparatus is greater than a preconfigured wakeup period of the communication apparatus; and
receive the beacon packet from the access point based on the low power consumption parameter,
wherein
the at least one processor configured to:
determine at least one second time point in a one-to-one correspondence the at least one first time point based on a start time point at which the access point previously started to send the beacon packet to the communication apparatus at the first time interval and the first time interval, wherein one second time point is a start time point at which the access point starts to send the beacon packet to the communication apparatus at the first time interval for one time, and
obtain the low power consumption parameter based on the detection information, the at least one second time point, and the preconfigured wakeup period of the communication apparatus, wherein the preconfigured wakeup period of the communication apparatus is the same as the first time interval.

8. The communication apparatus according to claim 7, wherein the low power consumption parameter comprises the actual wakeup period of the communication apparatus and the actual receive window length within which the communication apparatus receives the beacon packet;

the at least one processor is further configured to:
obtain at least one first offset, wherein each first offset is an offset of a first time point relative to a second time point corresponding to the first time point; and
obtain the low power consumption parameter based on the at least one first offset and the preconfigured wakeup period of the communication apparatus, wherein there is a correspondence between the at least one first offset and the actual wakeup period of the communication apparatus.

9. The communication apparatus according to claim 7, wherein the low power consumption parameter comprises the actual wakeup period of the communication apparatus;

the at least one processor is further configured to:
obtain at least one first offset, wherein each first offset is an offset of a first time point relative to a second time point corresponding to the first time point;
obtain an expected wakeup period of the communication apparatus based on the at least one first offset and the preconfigured wakeup period of the communication apparatus, wherein there is a correspondence between the expected wakeup period of the communication apparatus and the at least one first offset; and
perform a composite operation on the expected wakeup period of the communication apparatus and the first time interval, to obtain the low power consumption parameter.

10. The communication apparatus according to claim 7, wherein the detection information further comprises at least one third time point, one third time point is a start time point at which the access point actually starts to send a response packet to the communication apparatus for one time, one third time point corresponds to one fourth time point, and the fourth time point is a start time point at which the communication apparatus indicates the access point to start to send the response packet to the communication apparatus.

11. The communication apparatus according to claim 10, wherein the low power consumption parameter comprises the actual wakeup period of the communication apparatus and the actual receive window length within which the communication apparatus receives the beacon packet;

the at least one processor is further configured to:
obtain at least one first offset, wherein each first offset is an offset of a first time point relative to a second time point corresponding to the first time point;
obtain at least one second offset, wherein each second offset is an offset of a third time point relative to a fourth time point corresponding to the third time point; and
obtain the low power consumption parameter based on the at least one first offset, the at least one second offset, and the preconfigured wakeup period of the communication apparatus, wherein there is a correspondence among the at least one first offset, the at least one second offset, and the actual wakeup period of the communication apparatus.

12. The communication apparatus according to claim 10, wherein the low power consumption parameter comprises the actual wakeup period of the communication apparatus, and the at least one processor is further configured to:
obtain at least one first offset, wherein each first offset is an offset of a first time point relative to a second time point corresponding to the first time point;
obtain at least one second offset, wherein each second offset is an offset of a third time point relative to a fourth time point corresponding to the third time point;
obtain an expected wakeup period of the communication apparatus based on the at least one first offset, the at least one second offset, and the preconfigured wakeup period of the communication apparatus, wherein there is a correspondence among the at least one first offset, the at least one second offset, and the expected wakeup period of the communication apparatus; and
perform a composite operation on the expected wakeup period of the communication apparatus and the first time interval, to obtain the low power consumption parameter.

13. The method according to claim 1, wherein the second time point is determined by summing start time point at which the access point previously started to send the beacon packet to the station at the first time interval and the first time interval.

14. The method according to claim 1, wherein the at least one second time point comprises a plurality of second time points, each of the plurality of second time points is calculated by adding the first time interval to a preceding second time point, and each corresponding first time point is identified as a next actual beacon transmission following a prior first time point.

15. The method according to claim 2, wherein each of the at least one first offset comprises either a first pre-positioned offset or a first post-positioned offset, wherein: the first pre-positioned offset is used when the first time point is less than or equal to the second time point, and the first post-positioned offset is used when the first time point is greater than or equal to the second time point.

* * * * *